(12) United States Patent
Kim et al.

(10) Patent No.: US 10,302,174 B2
(45) Date of Patent: May 28, 2019

(54) PLANETARY GEAR TRAIN OF AN AUTOMATIC TRANSMISSION FOR A VEHICLE

(71) Applicants: HYUNDAI MOTOR COMPANY, Seoul (KR); KIA MOTORS CORPORATION, Seoul (KR)

(72) Inventors: Jin Ho Kim, Suwon-si (KR); Jinseok Kim, Seoul (KR); Jae Chang Kook, Hwaseong-si (KR); Dong Hwan Hwang, Seoul (KR); Seong Wook Hwang, Gunpo-si (KR); Woo Jin Chang, Suwon-si (KR); Tae Whan Kim, Yongin-si (KR); Seongwook Ji, Gunpo-si (KR); Chon Ok Kim, Yongin-si (KR); Wonmin Cho, Hwaseong-si (KR); Hyun Sik Kwon, Seoul (KR); Jong Sool Park, Hwaseong-si (KR); Kyeong Hun Lee, Seoul (KR); Jong Soo Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 43 days.

(21) Appl. No.: 15/655,484

(22) Filed: Jul. 20, 2017

(65) Prior Publication Data

US 2018/0180140 A1    Jun. 28, 2018

(30) Foreign Application Priority Data

Dec. 23, 2016  (KR) .................. 10-2016-0178309

(51) Int. Cl.
*F16H 3/66* (2006.01)
*F16H 3/62* (2006.01)

(52) U.S. Cl.
CPC ........ *F16H 3/66* (2013.01); *F16H 2200/0069* (2013.01); *F16H 2200/2012* (2013.01); *F16H 2200/2048* (2013.01)

(58) Field of Classification Search
CPC .............. F16H 3/66; F16H 2200/2012; F16H 2200/2048; F16H 2200/069
See application file for complete search history.

(56) References Cited

U.S. PATENT DOCUMENTS 6,634,980 B1 * 10/2003 Ziemer .................. F16H 3/66
                                                  475/275
7,691,024 B2 *  4/2010 Phillips .................. F16H 3/666
                                                  475/276

(Continued)

FOREIGN PATENT DOCUMENTS

| JP | 5526235 | 6/2014 |
| KR | 20160142091 | 12/2016 |
| WO | 2011020749 | 2/2011 |

*Primary Examiner* — Jacob S. Scott
*Assistant Examiner* — Tinh T Dang
(74) *Attorney, Agent, or Firm* — Lempia Summerfield Katz LLC

(57) ABSTRACT

A planetary gear train of an automatic transmission for a vehicle may include an input shaft receiving torque of an engine, an output shaft outputting an output torque, a first planetary gear set including first, second, and third rotational elements, a second planetary gear set including fourth, fifth, and sixth rotational elements, a third planetary gear set including seventh, eighth, and ninth rotational elements, and a fourth planetary gear set including tenth, eleventh, and twelfth rotational elements.

8 Claims, 2 Drawing Sheets

(56) References Cited

U.S. PATENT DOCUMENTS

| | | | |
|---|---|---|---|
| 9,458,914 B2 * | 10/2016 | Kato | ............... F16H 3/66 |
| 9,593,747 B2 | 3/2017 | Lee et al. | |
| 2012/0149527 A1 | 6/2012 | Gumpoltsberger et al. | |
| 2015/0252877 A1 | 9/2015 | Mellet et al. | |
| 2015/0369342 A1 * | 12/2015 | Kato | ............... F16H 3/66 |
| | | | 475/275 |
| 2016/0356359 A1 | 12/2016 | Lee et al. | |

* cited by examiner

FIG. 2

| SPEED STAGES | CONTROL ELEMENTS | | | | | | | | GEAR RATIO | STEP RATIO | NOTE |
|---|---|---|---|---|---|---|---|---|---|---|---|
| | C1 | C2 | C3 | C4 | B1 | B2 | B3 | | | | |
| D1 | | ● | | | ● | | | | 4.804 | | |
| D2 | | ● | ● | | ● | | | | 3.13 | 1.535 | |
| D3 | ● | ● | | | ● | | | | 2.12 | 1.476 | |
| D4 | ● | ● | | | ● | ● | | | 1.535 | 1.381 | |
| D5 | ● | ● | | | | ● | | | 1.19 | 1.290 | GEAR RATIO SPAN : 10.01 |
| D6 | ● | ● | ● | | | | | | 1 | 1.190 | |
| D7 | ● | | ● | | | ● | | | 0.812 | 1.232 | RATIO OF R/D1 : 1.04 |
| D8 | | | | ● | | ● | | | 0.677 | 1.199 | |
| D9 | | | ● | ● | | ● | | | 0.585 | 1.157 | |
| D10 | | ● | | ● | | ● | | | 0.48 | 1.219 | |
| REV | | | ● | | ● | | ● | | -5.008 | - | |

PLANETARY GEAR TRAIN OF AN AUTOMATIC TRANSMISSION FOR A VEHICLE

CROSS-REFERENCE TO RELATED APPLICATION

This application claims priority to and the benefit of Korean Patent Application No. 10-2016-0178309 filed in the Korean Intellectual Property Office on Dec. 23, 2016, the entire contents of which are incorporated herein by reference.

BACKGROUND

(a) Field of the Disclosure

The present disclosure relates to automatic transmissions for vehicles. More particularly, the present disclosure relates to a planetary gear train of an automatic transmission of a vehicle.

(b) Description of the Related Art

Generally, automatic transmissions achieving more speed stages have been developed to enhance fuel economy and optimize drivability. Increasing oil prices have triggered fierce competition to enhance vehicle fuel consumption.

Therefore, research into weight reduction and enhancing fuel economy through downsizing of an engine has been conducted. Research has also been conducted for securing drivability and fuel economy through multiple speed stages of automatic transmissions.

However, in an automatic transmission, as the number of speed stages increases, the number of internal components (particularly, planetary gear sets) increases. As a result, the length of the transmission increases, which may deteriorate the mountability, cost, weight, transmission efficiency, and the like.

In recent years, 8-speed automatic transmissions have been implemented. Research and development of a planetary gear train capable of implementing more speed stages have also been actively conducted.

However, a conventional 8-speed automatic transmission typically includes three to four planetary gear sets and five to seven control elements (frictional elements). Thus, since the length of the automatic transmission increases, mountability may deteriorate.

Recently, one planetary gear set disposed above another planetary gear set has been attempted, but structures of automatic transmissions utilizing parallel planetary gear sets are very limited.

Employing dog clutches instead of wet-type control elements have been used. However, shift feel may deteriorate.

In addition, since conventional 8-speed automatic transmissions have gear ratio spans of 6.5-7.5, improvement of fuel economy may not be great.

In addition, if 8-speed automatic transmissions have gear ratio spans larger than 9.0, it may be difficult to secure linearity of step ratios. Therefore, driving efficiency of an engine and drivability of a vehicle may deteriorate.

The above information disclosed in this Background section is only to enhance understanding of the background of the disclosure. Therefore, the background may contain information that is not prior art that is already known in this country to a person of ordinary skill in the art.

SUMMARY

The present disclosure is directed to a planetary gear train of an automatic transmission for a vehicle. The disclosed planetary gear train improves power delivery performance and fuel economy by achieving ten forward speed stages and at least one reverse speed stage. The disclosed planetary gear train also achieves a widening gear ratio span and secures a linearity of step ratios.

A planetary gear train of an automatic transmission for a vehicle according to an embodiment of the present disclosure may include: an input shaft receiving torque of an engine; an output shaft outputting torque; a first planetary gear set including first, second, and third rotational elements; a second planetary gear set including fourth, fifth, and sixth rotational elements; a third planetary gear set including seventh, eighth, and ninth rotational elements; a fourth planetary gear set including tenth, eleventh, and twelfth rotational elements; a first shaft connected with the first rotational element and the fifth rotational element, and connected with the input shaft; a second shaft connected with the second rotational element and the sixth rotational element; a third shaft connected with the third rotational element and the tenth rotational element; a fourth shaft connected with the seventh rotational element and the twelfth rotational element; a fifth shaft connected with the ninth rotational element and selectively connected with the first shaft or the second shaft; and a sixth shaft connected with the eleventh rotational element and connected with the output shaft.

The fourth shaft may be selectively connected with a transmission housing.

The planetary gear train may further include: a seventh shaft connected with the fourth rotational element and selectively connected with the transmission housing; and an eighth shaft connected with the eighth rotational element and selectively connected with the transmission housing, the third shaft, or the sixth shaft.

The first, second, and third rotational elements of the first planetary gear set may be a first sun gear, a first planet carrier, and a first ring gear, respectively. The fourth, fifth, and sixth rotational elements of the second planetary gear set may be a second sun gear, a second planet carrier, and a second ring gear, respectively. The seventh, eighth, and ninth rotational elements of the third planetary gear set may be a third sun gear, a third planet carrier, and a third ring gear, respectively. The tenth, eleventh, and twelfth rotational elements of the fourth planetary gear set may be a fourth sun gear, a fourth planet carrier, and a fourth ring gear, respectively.

The planetary gear train may further include: a first clutch selectively connecting the sixth shaft with the eighth shaft; a second clutch selectively connecting the first shaft with the fifth shaft; a third clutch selectively connecting the second shaft with the fifth shaft; a fourth clutch selectively connecting the third shaft with the eighth shaft; a first brake selectively connecting the fourth shaft with the transmission housing; a second brake selectively connecting the seventh shaft with the transmission housing; and a third brake selectively connecting the eighth shaft with the transmission housing.

A planetary gear train of an automatic transmission for a vehicle according to another embodiment of the present disclosure may include: an input shaft receiving torque of an engine; an output shaft outputting torque; a first planetary gear set including first, second, and third rotational elements; a second planetary gear set including fourth, fifth, and sixth rotational elements; a third planetary gear set including seventh, eighth, and ninth rotational elements; and a fourth planetary gear set including tenth, eleventh, and twelfth rotational elements. The input shaft may be connected with the fifth rotational element, the output shaft may be connected with the eleventh rotational element, the first rotational element may be connected with the fifth rotational element, the second rotational element may be connected with the sixth rotational element, the third rotational element may be connected with the tenth rotational element, the seventh rotational element may be connected with the twelfth rotational element, the first rotational element may be selectively connected with the ninth rotational element, the second rotational element may be selectively connected with the ninth rotational element, and the eighth rotational element may be selectively connected with the tenth rotational element or the eleventh rotational element.

Each of the fourth, seventh, and eighth rotational elements may be selectively connected to a transmission housing, respectively.

The first, second, and third rotational elements of the first planetary gear set may be a first sun gear, a first planet carrier, and a first ring gear, respectively. The fourth, fifth, and sixth rotational elements of the second planetary gear set may be a second sun gear, a second planet carrier, and a second ring gear, respectively. The seventh, eighth, and ninth rotational elements of the third planetary gear set may be a third sun gear, a third planet carrier, and a third ring gear, respectively. The tenth, eleventh, and twelfth rotational elements of the fourth planetary gear set may be a fourth sun gear, a fourth planet carrier, and a fourth ring gear, respectively.

The planetary gear train may further include: a first clutch selectively connecting the eighth rotational element with the eleventh rotational element; a second clutch selectively connecting the first rotational element with the ninth rotational element; a third clutch selectively connecting the second rotational element with the ninth rotational element; a fourth clutch selectively connecting the eighth rotational element with the tenth rotational element; a first brake selectively connecting the seventh rotational element with the transmission housing; a second brake selectively connecting the fourth rotational element with the transmission housing; and a third brake selectively connecting the eighth rotational element with the transmission housing.

An embodiment of the present disclosure may achieve ten forward speed stages and one reverse speed stage by combining four planetary gear sets with seven control elements.

In addition, since a gear ratio span greater than 10.01 is secured, driving efficiency of the engine may be maximized.

In addition, since linearity of step ratios is secured, drivability such as acceleration before and after a shift, rhythmical engine speed, and so on may be improved.

Other effects obtainable or predictable from the embodiments of the present disclosure are explicitly or implicitly described in the DETAILED DESCRIPTION section below. In other words, various effects predictable from the embodiments of the present disclosure will be described in the DETAILED DESCRIPTION section below.

BRIEF DESCRIPTION OF THE DRAWINGS

FIG. 2 is an operation chart of control elements at each speed stage in the planetary gear train according to an embodiment of the present disclosure.

DETAILED DESCRIPTION OF THE EMBODIMENTS

Figure 1:
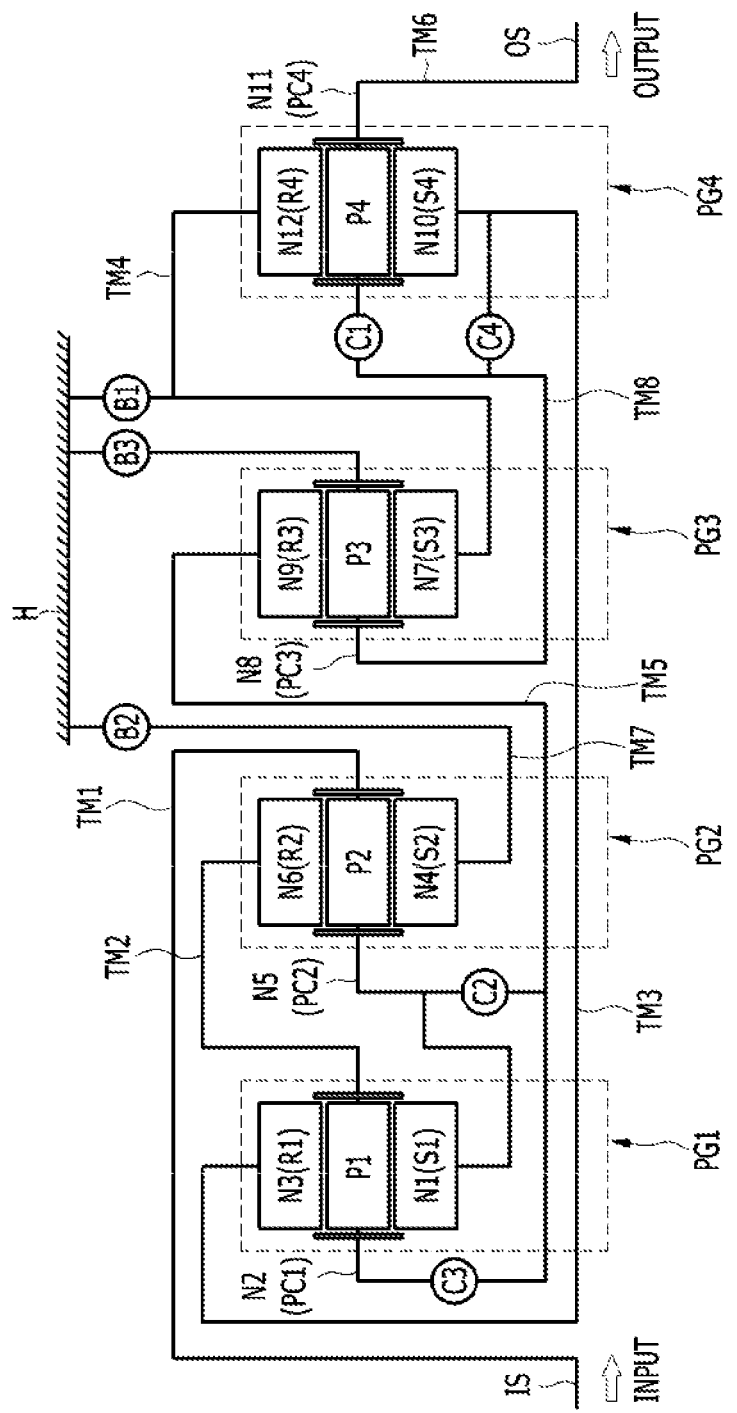
FIG. 1 is a schematic diagram of a planetary gear train according to an embodiment of the present disclosure.

It is desired to develop a planetary gear train capable of representing maximum efficiency by a small number of components in order to increase fuel efficiency through multi-staging of speed changes or gear shifts. In one example, development of high efficiency automatic transmissions, which achieve at least nine forward speed stages is desirable. In this aspect, the present disclosure relates to a planetary gear train of an automatic transmission for a vehicle. The disclosed planetary gear train may improve power delivery performance and reduce fuel consumption by implementing a speed change stage of at least ten forward speeds and widening gear ratio spans using a minimum number of components. The disclosed planetary gear train may also secure linearity of step ratios.

Hereinafter, one embodiment of the present disclosure is described in detail with reference to the accompanying drawings. In the drawings, the following symbols are used to identify various elements of the disclosed embodiments, wherein:
  i. B1, B2, B3 represent first, second, and third brakes;
  C1, C2, C3, 04 represent first, second, third, and fourth clutches;
  iii. N1, N2, N3, N4, N5, N6, N7, N8, N9, NW, N11, N12 represent first, second, third, fourth, fifth, sixth, seventh, eighth, ninth, tenth, eleventh, and twelfth rotational elements;
  iv. PG1, PG2, PG3, PG4 represent first, second, third, and fourth planetary gear sets;
  v. S1, S2, S3, S4 represent first, second, third, and fourth sun gears;
  vi. PC1, PC2, PC3, PC4 represent first, second, third, and fourth planet carriers;
  vii. R1, R2, R3, R4 represent first, second, third, and fourth ring gears;
  viii. P1, P2, P3, P4 represent first, second, third, and fourth pinion gears;
  ix. IS represents an input shaft;
  x. OS represents an output shaft; and
  xi. TM1, TM2, TM3, TM4, TM5, TM6, TM7, TM8 represent first, second, third, fourth, fifth, sixth, seventh, and eighth shafts.

However, parts that are not related with the description are omitted for clearly describing the embodiments of the present disclosure. Also, like reference numerals refer to like or similar elements throughout the specification.

In the following description, using names or terms to identify components such as first, second, third, and the like is to differentiate the names because the names of the components are otherwise the same as each other. Such a naming convention is not intended to denote or set an order thereof and the disclosure is not intended to be so limited.

FIG. 1 is a schematic diagram of a planetary gear train according to one embodiment of the present disclosure.

Referring to FIG. 1, a planetary gear train according to one embodiment of the present disclosure includes first, second, third, and fourth planetary gear sets PG1, PG2, PG3, and PG4 disposed on the same axis. In one embodiment, the planetary gear train also includes an input shaft IS, an output shaft OS, eight rotation shafts TM1-TM8 connected to at least one rotational element of the first, second, third, and fourth planetary gear sets PG1, PG2, PG3, and PG4, four clutches C1-C4 that are control elements and three brakes B1-B3 that are also control elements, and a transmission housing H.

Torque input from the input shaft IS is changed by cooperation of the first, second, third, and fourth planetary gear sets PG1, PG2, PG3, and PG4. The changed torque is output through the output shaft OS.

In this embodiment, the planetary gear sets are arranged in the sequence of the first, second, third, and fourth planetary gear sets PG1, PG2, PG3, and PG4 from an engine side.

The input shaft IS is an input member. Torque from a crankshaft of an engine, after being torque-converted through a torque converter, is input into the input shaft IS.

The output shaft OS is an output member. The output shaft OS is disposed in parallel with the input shaft IS and transmits driving torque to a driving wheel through a differential apparatus.

In this embodiment, the first planetary gear set PG1 is a single pinion planetary gear set. The first planetary gear set PG1 includes a first sun gear S1, a first planet carrier PC1 rotatably supporting a first pinion P1 that is externally meshed with the first sun gear S1, and a first ring gear R1 that is internally meshed with the first pinion P1, respectively, as first, second, and third rotational elements N1, N2, and N3.

In this embodiment, the second planetary gear set PG2 is a single pinion planetary gear set. The second planetary gear set PG2 includes a second sun gear S2, a second planet carrier PC2 rotatably supporting a second pinion P2 that is externally meshed with the second sun gear S2, and a second ring gear R2 that is internally meshed with the second pinion P2, respectively, as fourth, fifth, and sixth rotational elements N4, N5, and N6.

In this embodiment, the third planetary gear set PG3 is a single pinion planetary gear set. The third planetary gear set PG3 includes a third sun gear S3, a third planet carrier PC3 rotatably supporting a third pinion P3 that is externally meshed with the third sun gear S3, and a third ring gear R3 that is internally meshed with the third pinion P3, respectively, as seventh, eighth, and ninth rotational elements N7, N8, and N9.

In this embodiment, the fourth planetary gear set PG4 is a single pinion planetary gear set. The fourth planetary gear set PG4 includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4, respectively, as tenth, eleventh, and twelfth rotational elements N10, N11, and N12.

The first rotational element N1 is directly connected with the fifth rotational element N5. The second rotational element. N2 is directly connected with the sixth rotational element N6. The third rotational element N3 is directly connected with the tenth rotational element N10. The seventh rotation element N7 is directly connected with the twelfth rotational element N12. The first, second, third, and fourth planetary gear sets PG1, PG2, PG3, and PG4 include eight shafts TM1-TM8.

The eight shafts TM1-TM8 will be described in further detail below.

The eight shafts TM1-TM8 may be rotation members that directly connect a plurality of rotational elements among the rotational elements of the planetary gear sets PG1, PG2, PG3, and PG4 with each other. The eight shafts TM1-TM8 may also be directly connected to any one rotational element of the planetary gear sets PG1, PG2, PG3, and PG4 and rotate with the any one rotational element to transmit torque. The eight shafts TM1-TM8 may also be fixed members that selectively or directly connect any one rotational element of the planetary gear sets PG1, PG2, PG3, and PG4 to the transmission housing H to fix any one of the rotational elements.

In this embodiment, the first shaft TM1 connects the first rotational element N1 (first sun gear S1) with the fifth rotational element N5 (second planet carrier PC2). The first shaft TM1 is also directly connected with the input shaft IS.

In this embodiment, the second shaft TM2 connects the second rotational element N2 (first planet carrier PC1) with the sixth rotational element N6 (second ring gear R2).

In this embodiment, the third shaft TM3 connects the third rotational element N3 (first ring gear R1) with the tenth rotational element N10 (fourth sun gear S4).

In this embodiment, the fourth shaft TM4 connects the seventh rotational element N7 (third sun gear S3) with the twelfth rotational element N12 (fourth ring gear R4). The fourth shaft TM4 is also selectively connected with the transmission housing H.

In this embodiment, the fifth shaft TM5 is connected with the ninth rotational element N9 (third ring gear R3). The fifth shaft TM5 is also selectively connected with the first shaft TM1 or the second shaft TM2.

In this embodiment, the sixth shaft TM6 is connected with the eleventh rotational element N11 (fourth planet carrier PC4). The sixth shaft TM6 is also directly connected with the output shaft OS.

In this embodiment, the seventh shaft TM7 is connected with the fourth rotational element N4 (second sun gear S2). The seventh shaft TM7 is also selectively connected with the transmission housing H.

In this embodiment, the eighth shaft. TM8 is connected with the eighth rotational element N8 (third planet carrier PC3). The eighth shaft TM8 is also selectively connected with the transmission housing H. The eighth shaft. TM8 is also selectively connected with the third shaft TM3 or the sixth shaft TM6.

In addition, four clutches C1 C2, C3, and C4, which are control elements, are disposed at portions at which any two shafts among the eight shafts TM1-TM8, including the input shaft IS and the output shaft OS, are selectively connected to each other.

In addition, three brakes B1, B2, and B3, which are control elements, are disposed at portions at which any one shaft among the eight shafts TM1-TM8 is selectively connected to the transmission housing H.

Arrangements of the four clutches C1-C4 and the three brakes B1, B2, and B3 for this embodiment are described in detail below.

The first clutch C1 is disposed between the sixth shaft TM6 and the eighth shaft TM8. The first clutch C1 selectively connects the sixth shaft TM6 with the eighth shaft TM8.

The second clutch C2 is disposed between the first shaft. TM1 and the fifth shaft TM5. The second clutch C2 selectively connects the first shaft TM1 with the fifth shaft TM5.

The third clutch C3 is disposed between the second shaft. TM2 and the fifth shaft TM5. The third clutch C3 selectively connects the second shaft TM2 with the fifth shaft TM5.

The fourth clutch C4 is disposed between the third shaft TM3 and the eighth shaft TM8. The fourth clutch C4 selectively connects the third shaft TM3 with the eighth shaft TM8.

The first brake B1 is disposed between the fourth shaft TM4 and the transmission housing H. The first brake B1 selectively connects and fixes the fourth shaft TM4 to the transmission housing H.

The second brake B2 is disposed between the seventh shaft TM7 and the transmission housing H. The second brake B2 selectively connects and fixes the seventh shaft TM7 to the transmission housing H.

The third brake B3 is disposed between the eighth shaft TM8 and the transmission housing H. The third brake B3 selectively connects and fixes the eighth shaft TM8 with the transmission housing H.

The control elements including the first, second, third, and fourth clutches C1, C2, C3, and C4 and the first, second, and third brakes B1, B2, and B3 may be frictionally engaging units that are operated by hydraulic pressure. The control elements may be, but not limited to, multi-plate friction elements of a wet type. However, the control elements may also be engaging units that are operated by electrical signal, such as dog clutches, electric clutches, magnetic particle clutches, or the like.

FIG. 2 is an operation chart of the control elements at each speed stage in the planetary gear train according to an embodiment of the present disclosure.

As shown in FIG. 2, three control elements among the first, second, third, and fourth clutches C1, C2, C3, and C4 and the first, second, and third brakes B1, B2, and B3 are operated at each speed stage in the planetary gear train according to an embodiment of the present disclosure.

In this embodiment, the second and fourth clutches C2 and C4 and the first brake B1 are operated at a first forward speed stage D1.

Torque of the input shaft IS is input to the first shaft TM1 in a state where the first shaft TM1 is connected with the fifth shaft TM5 by operation of the second clutch C2 and where the third shaft TM3 is connected with the eighth shaft TM8 by operation of the fourth clutch C4.

In addition, the fourth shaft TM4 is operated as the fixed element by operation of the first brake B1. In this arrangement, the torque of the input shaft IS is shifted into the first forward speed stage D1 and the first forward speed stage D1 is output through the output shaft OS connected with the sixth shaft TM6.

In this embodiment, the second and third clutches C2 and C3 and the first brake B1 are operated at a second forward speed stage D2.

Torque of the input shaft IS is input to the first shaft TM1 in a state where the first shaft TM1 is connected with the fifth shaft TM5 by operation of the second clutch C2 and where the second shaft TM2 is connected with the fifth shaft TM5 by operation of the third clutch C3.

In addition, the fourth shaft TM4 is operated as the fixed element by operation of the first brake B1. In this arrangement, the torque of the input shaft IS is shifted into the second forward speed stage D2 and the second forward speed stage D2 is output through the output shaft OS connected with the sixth shaft TM6.

In this embodiment, the second clutch C2 and the first and second brakes B1 and B2 are operated at a third forward speed stage D3.

Torque of the input shaft IS is input to the first shaft TM1 in a state where the first shaft TM1 is connected with the eighth shaft TM8 by operation of the second clutch C2.

In addition, the fourth shaft and the seventh shaft TM4 and TM7 are operated as the fixed elements by operation of the first and second brakes B1 and B2. In this arrangement, the torque of the input shaft IS is shifted into the third forward speed stage D3 and the third forward speed stage D3 is output through the output shaft OS connected with the sixth shaft TM6.

In this embodiment, the first and second clutches C1 and C2 and the first brake B1 are operated at a fourth forward speed stage D4.

Torque of the input shaft IS is input to the first shaft TM1 in a state where the sixth shaft TM6 is connected with the eighth shaft TM8 by operation of the first clutch C1 and where the first shaft TM1 is connected with the fifth shaft TM5 by operation of the second clutch C2.

In addition, the fourth shaft TM4 is operated as the fixed element by operation of the first brake B1. In this arrangement, the torque of the input shaft IS is shifted into the fourth forward speed stage D4 and the fourth forward speed stage D4 is output through the output shaft OS connected with the sixth shaft TM6.

In this embodiment, the first and second clutches C1 and C2 and the second brake B2 are operated at a fifth forward speed stage D5.

Torque of the input shaft IS is input to the first shaft TM1 in a state where the sixth shaft TM6 is connected with the eighth shaft TM8 by operation of the first clutch C1 and where the first shaft TM1 is connected with the fifth shaft TM5 by operation of the second clutch C2.

In addition, the seventh shaft TM7 is operated as the fixed element by operation of the second brake B2. In this arrangement, the torque of the input shaft IS is shifted into the fifth forward speed stage D5 and the fifth forward speed stage D5 is output through the output shaft OS connected with the sixth shaft. TM6.

In this embodiment, the first, second, and third clutches C1, C2, and C3 are operated at a sixth forward speed stage D6.

Torque of the input shaft IS is input to the first shaft TM1 in a state where the sixth shaft TM6 is connected with the eighth shaft TM8 by operation of the first clutch C1, where the first shaft TM1 is connected with the fifth shaft TM5 by operation of the second clutch C2, and where the second shaft. TM2 is connected with the fifth shaft TM5 by operation of the third clutch C3.

In this arrangement, the first, second, third, and fourth planetary gear sets PG1, PG2, PG3, and PG4 become lock-up states. In this arrangement, the torque of the input shaft IS is output through the output shaft OS connected with the sixth shaft TM6 without changing rotation speed.

In this embodiment, the first and third clutches C1 and C3 and the second brake B2 are operated at a seventh forward speed stage D7.

Torque of the input shaft IS is input to the first shaft TM1 in a state where the sixth shaft TM6 is connected with the eighth shaft TM8 by operation of the first clutch C1 and where the second shaft TM2 is connected with the fifth shaft TM5 by operation of the third clutch C3.

In addition, the seventh shaft TM7 is operated as the fixed element by operation of the second brake B2. In this arrangement, the torque of the input shaft IS is shifted into the seventh forward speed stage D7 and the seventh forward speed stage D7 is output through the output shaft OS connected with the sixth shaft TM6.

In this embodiment, the first and fourth clutches C1 and C4 and the second brake B2 are operated at an eighth forward speed stage D8.

Torque of the input shaft IS is input to the first shaft TM1 in a state where the sixth shaft TM6 is connected with the eighth shaft TM8 by operation of the first clutch C1 and where the third shaft TM3 is connected with the eighth shaft TM8 by operation of the fourth clutch C4.

In addition, the seventh shaft TM7 is operated as the fixed element by operation of the second brake B2. In this arrangement, the torque of the input shaft IS is shifted into the eighth forward speed stage D8 and the eighth forward speed stage D8 is output through the output shaft OS connected with the sixth shaft TM6.

In this embodiment, the third and fourth clutches C3 and C4 and the second brake B2 are operated at a ninth forward speed stage D9.

Torque of the input shaft IS is input to the first shaft TM1 in a state where the second shaft TM2 is connected with the fifth shaft TM5 by operation of the third clutch C3 and where the third shaft TM3 is connected with the eighth shaft TM8 by operation of the fourth clutch C4.

In addition, the seventh shaft TM7 is operated as the fixed element by operation of the second brake B2. In this arrangement, the torque of the input shaft IS is shifted into the ninth forward speed stage D9 and the ninth forward speed stage D9 is output through the output shaft OS connected with the sixth shaft TM6.

In this embodiment, the second and fourth clutches C2 and C4 and the second brake B2 are operated at a tenth forward speed stage D10.

Torque of the input shaft IS is input to the first shaft TM1 in a state where the first shaft TM1 is connected with the fifth shaft TM5 by operation of the second clutch C2 and where the third shaft TM3 is connected with the eighth shaft TM8 by operation of the fourth clutch C4.

In addition, the seventh shaft TM7 is operated as the fixed element by operation of the second brake B2. In this arrangement, the torque of the input shaft IS is shifted into the tenth forward speed stage D10 and the tenth forward speed stage D10 is output through the output shaft OS connected with the sixth shaft TM6.

In this embodiment, the third clutch C3 and the first and third brakes B1 and B3 are operated at a reverse speed stage REV.

Torque of the input shaft IS is input to the first shaft TM1 in a state where the second shaft TM2 is connected with the fifth shaft TM6 by operation of the third clutch C3.

In addition, the fourth shaft TM4 and the eighth shaft TM8 are operated as the fixed elements by operation of the first and third brakes B1 and B3. In this arrangement, the torque of the input shaft IS is shifted into the reverse speed stage REV and the reverse speed stage REV is output through the output shaft OS connected with the sixth shaft TM6 as an inverse rotation speed.

The planetary gear train according to one embodiment of the present disclosure may achieve at least ten forward speed stages and at least one reverse speed stage by combining four planetary gear sets PG1, PG2, PG3, and PG4 with four clutches C1, C2, C3, and C4 and three brakes B1, B2, and B3.

In addition, since a gear ratio span greater than 10.0 is secured, driving efficiency of the engine may be maximized.

In addition, since linearity of step ratios is secured, drivability such as acceleration before and after a shift, rhythmical engine speed, and so on may be improved.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, the planetary gear train comprising:
   an input shaft receiving torque of an engine;
   an output shaft outputting an output torque;
   a first planetary gear set including a first, a second, and a third rotational element;
   a second planetary gear set including a fourth, a fifth, and a sixth rotational element;
   a third planetary gear set including a seventh, an eighth, and a ninth rotational element;
   a fourth planetary gear set including a tenth, an eleventh, and a twelfth rotational element;
   a first shaft directly connected with the first rotational element, the fifth rotational element, and the input shaft;
   a second shaft directly connected with the second rotational element and the sixth rotational element;
   a third shaft directly connected with the third rotational element and the tenth rotational element;
   a fourth shaft directly connected with the seventh rotational element and the twelfth rotational element;
   a fifth shaft directly connected with the ninth rotational element, selectively connected with the first shaft, and selectively connected with the second shaft; and
   a sixth shaft directly connected with the eleventh rotational element and the output shaft.

2. The planetary gear train of claim 1, wherein the fourth shaft is selectively connected with a transmission housing, and
   wherein the planetary gear train further comprises:
   a seventh shaft connected with the fourth rotational element and selectively connected with the transmission housing; and
   an eighth shaft connected with the eighth rotational element and selectively connected with the transmission housing, the third shaft, or the sixth shaft.

3. The planetary gear train of claim 1, wherein:
   the first, second, and third rotational elements of the first planetary gear set are a first sun gear, a first planet carrier, and a first ring gear, respectively;
   the fourth, fifth, and sixth rotational elements of the second planetary gear set are a second sun gear, a second planet carrier, and a second ring gear, respectively;
   the seventh, eighth, and ninth rotational elements of the third planetary gear set are a third sun gear, a third planet carrier, and a third ring gear, respectively; and
   the tenth, eleventh, and twelfth rotational elements of the fourth planetary gear set are a fourth sun gear, a fourth planet carrier, and a fourth ring gear, respectively.

4. The planetary gear train of claim 2, further comprising:
   a first clutch selectively connecting the sixth shaft with the eighth shaft;
   a second clutch selectively connecting the first shaft with the fifth shaft;
   a third clutch selectively connecting the second shaft with the fifth shaft;
   a fourth clutch selectively connecting the third shaft with the eighth shaft;
   a first brake selectively connecting the fourth shaft with the transmission housing;
   a second brake selectively connecting the seventh shaft with the transmission housing; and
   a third brake selectively connecting the eighth shaft with the transmission housing.

5. A planetary gear train of an automatic transmission for a vehicle, the planetary gear train comprising:
- an input shaft receiving torque of an engine;
- an output shaft outputting an output torque;
- a first planetary gear set including a first, a second, and a third rotational element;
- a second planetary gear set including a fourth, a fifth, and a sixth rotational element;
- a third planetary gear set including a seventh, an eighth, and a ninth rotation element; and
- a fourth planetary gear set including a tenth, an eleventh, and a twelfth rotational element,
- wherein the input shaft is connected with the fifth rotational element,
- the output shaft is connected with the eleventh rotational element,
- the first rotational element is connected with the fifth rotational element,
- the second rotational element is connected with the sixth rotational element,
- the third rotational element is connected with the tenth rotational element,
- the seventh rotational element is connected with the twelfth rotational element,
- the first rotational element is selectively connected with the ninth rotational element,
- the second rotational element is selectively connected with the ninth rotational element, and
- the eighth rotational element is selectively connected with the tenth rotational element or the eleventh rotational element.

6. The planetary gear train of claim 5, wherein the fourth, seventh, and eighth rotational elements are selectively connected to a transmission housing, respectively.

7. The planetary gear train of claim 5, wherein:
- the first, second, and third rotational elements of the first planetary gear set are a first sun gear, a first planet carrier, and a first ring gear, respectively;
- the fourth, fifth, and sixth rotational elements of the second planetary gear set are a second sun gear, a second planet carrier, and a second ring gear, respectively;
- the seventh, eighth, and ninth rotational elements of the third planetary gear set are a third sun gear, a third planet carrier, and a third ring gear, respectively; and
- the tenth, eleventh, and twelfth rotational elements of the fourth planetary gear set are a fourth sun gear, a fourth planet carrier, and a fourth ring gear, respectively.

8. The planetary gear train of claim 6, further comprising:
- a first clutch selectively connecting the eighth rotational element with the eleventh rotational element;
- a second clutch selectively connecting the first rotational element with the ninth rotational element;
- a third clutch selectively connecting the second rotational element with the ninth rotational element;
- a fourth clutch selectively connecting the eighth rotational element with the tenth rotational element;
- a first brake selectively connecting the seventh rotational element with the transmission housing;
- a second brake selectively connecting the fourth rotational element with the transmission housing; and
- a third brake selectively connecting the eighth rotational element with the transmission housing.

* * * * *